DEFENSIVE PUBLICATION

UNITED STATES PATENT OFFICE

Published at the request of the applicant or owner in accordance with the Notice of Dec. 16. 1969. 869 O.G. 687. The abstracts of Defensive Publication applications are identified by distinctly numbered series and are arranged chronologically. The heading of each abstract indicates the number of pages of specification. including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 981

T890,011

TRILOBAL NYLON FILAMENTS CONTAINING POLY(ALKYLENE ETHER)

Ashok J. Champaneria, 402 William St., Seaford, Del. 19973; Thomas P. Doherty, 3321 Rockfield Drive N., Devonshire, Wilmington, Del. 19810; and Robert R. Moneymaker, 43 Read St., Seaford, Del. 199873

Filed Oct. 26, 1970, Ser. No. 84,242

Int. Cl. D02g *3/22*

U.S. Cl. 161—174

No Drawing. 5 Pages Specification

Synthetic trilobal filaments with a modification ratio of 1.55 to 1.75 containing 3 to 8% by weight of a high molecular weight, water-soluble poly(alkylene ether) are soil-resistant and have a reduced tendency to change color when wet. Preferably, the filaments are nylon and have a tip radius of 0.3 to 0.5; the preferred poly(alkylene ether) is poly(ethylene ether) glycol.